Patented Dec. 8, 1942

2,304,256

UNITED STATES PATENT OFFICE 2,304,256

TREATMENT OF WELL DRILLING FLUIDS

Leon W. Huebel, Los Angeles County, Calif., assignor to National Lead Company, Los Angeles, Calif., a corporation of New Jersey No Drawing. Application January 15, 1940, Serial No. 313,921

9 Claims. (Cl. 252—8.5)

This invention relates to the art of chemically treating and recovering contaminated drilling fluids, such as are used in the rotary method of drilling oil and gas wells, and relates particularly to the treatment of such muds which have been contaminated with cement.

In the drilling of wells by the rotary method a drilling fluid is used which generally consists of an aqueous clay suspension, often containing weighting agents such as barytes or hematite, to increase the hydrostatic head, and frequently containing also concentrated colloidal suspending and conditioning agents such as bentonite.

The drilling fluid serves to bring cuttings to the surface, to cool the bit, and to keep oil, gas, and water confined to their respective formations during the drilling process. For these functions it is necessary that the drilling fluid be of pumpable viscosity, have sufficient gel-strength to bring cuttings to the surface, and yet be fluid enough to release cuttings and entrained gas at the surface.

A highly important property of drilling muds is the ability to form an impervious filter cake upon the permeable walls of the bore hole, thus inhibiting further ingress of water from the drilling fluid into the formation. A drilling mud deficient in this property allows an undue amount of water to enter the formation, which leads to caving and loss of production in productive formations, and also permits the formation of a thick filter cake which may stick the drill stem, and in any case greatly increases the swabbing action when the bit is withdrawn from the hole. Such a drilling fluid represents a rather delicate colloidal suspension, the chemical environment of which must be precisely adjusted in certain respects in order that the suspension, due to its colloidal nature, may not change its properties so as to become useless for the purpose for which it is employed. Now while mud-laden drilling fluids are flocculated and generally thereby thickened by the addition of salt in sufficient quantity, the addition of di-valent ions to a clay suspension will produce a similar effect with a far smaller amount of added di-valent cations salt, in accordance with a principle first explained by Freundlich. Less than 1% of calcium hydroxide, for example, will serve to cause an otherwise freely flowing drilling fluid to change into a plastic mass even thicker than commercial mayonnaise, so that the fluid is thereafter not pumpable, fails to deposit cuttings in the ditch, becomes gas-cut, i. e., retains gas picked up in the hole so that its effect of density becomes lighter and lighter, making pumping even more difficult, and completely loses its useful walling properties. As is well known, hydraulic cement even after it has set contains a great deal of free lime, and thus is capable of adding calcium ions to water in contact therewith, not only because of this free lime content, but probably also because of its content of semi-soluble calcium alumino silicates and other calcium compounds. Even when cement is allowed to set above ground, as in construction work, the free calcium ions available therefrom disappear only after a considerable period of time.

Oil and gas wells are generally drilled in several successive sections of diminishing diameter, each section being separately cased with steel casing. In order to prevent the flow of fluids from behind one cased section into the adjoining section, it is necessary to seal off each section from the rest by means of hydraulic cement, which is generally displaced downwards through the casing from whence it flows upward externally thereto between the casing and the wall of the bore hole. Operations such as these, and also side-tracking operations, necessarily leave a certain amount of cement in the bottom of the bore hole; the amount of cement left therein may vary from a couple of feet to as much as 50 or 100 feet, depending upon the skill with which the cement was placed. When drilling is recommenced in order to carry the bore hole deeper than the casing so set, this residue of cement is drilled up by the bit and commingles with the drilling fluid. For the reasons explained above, the addition of this drilled-out cement thickens the mud and makes it useless for further drilling purposes.

In the past it has generally been the practice to discard such muds, thereby incurring a considerable monetary loss, particularly when the drilling fluid had been weighted with weighting materials. It is possible to reclaim such muds and convert them to usable muds having generally characteristics equal to the original mud by treatment with carbonates, and particularly sodium bicarbonate, and phosphates, particularly di-sodium orthophosphate and sodium hexametaphosphate. According to this method of treatment the treating agent is mixed with the thick mud as it issues from the flow line, or the whole of the mud may be transferred to a suitable treating tank and the mud reconditioned therein. While this method of treatment yields satisfactory results, and has for this reason become increasingly popular in those oil fields where rotary drilling is common, such methods are expensive from a material standpoint.

One of the objects of this invention is to provide an improved method of treating cement contaminated muds.

Another object is to make possible the successful treatment of cement contaminated muds which under ordinary methods of treatment would not be susceptible to satisfactory reconditioning.

Another object is to improve upon the usual technique not only by way of achieving marked economy in the amount of treating agents necessary, but also by way of making the treatment more effective and considerably less liable to failure and to effect economies in the treatment of cement contaminated muds.

Other objects will appear as the description of the invention proceeds.

Generally stated and in accordance with this invention, the drilling fluid is treated with the treating agent a substantial period before the cement in the bore hole is reached by the bit, that is, before drilling is continued at that depth. The depth at which the cement occurs can be determined in the usual manner by the extension of the drill stem into the bore-hole. Generally the treating agent is added to the fluid for about an hour before the bit actually commences to drill up the cement, but with circulation being maintained in the system, so that even the fluid at the bottom of the bore hole may be laden with treating agents when the first cement is drilled out that is, treatment with the agents is begun before contamination of the fluid begins, although it is preferably continued thereafter. The agent may be any of the agents heretofore employed in the treatment of cement-cut muds of which one of the carbonates, such as sodium-bicarbonate is the most economical.

Several important advantages accrue from this method of treatment, and in fact often convert what would otherwise be failure into a success. Perhaps the most important advantage is that the mud at no time becomes particularly thick. This makes drilling and pumping easier, but of greater importance is the fact that it enables the cuttings of cement to be deposited on the screen and in the ditch so that they will not be recirculated and finally completely worked into the mud stream. In spite of the fact that a vibrating screen is generally used, a thick mud such as generally occurs in cement contamination cannot be handled by the ordinary type of vibrating screen, but flows over the top of the screen so that cuttings of cement are retained in the mud.

A thin mud also is easier to treat than a thick mud, and even with this improved method of treatment it is desirable to carry out some portion at least of the total treatment after the drilling out of the cement has commenced, for otherwise an undue amount of treating agent may have to be added to the uncontaminated mud, and the treatment as a whole loses flexibility if the entire calculated amount of treating agent is added initially. The addition of the treating agent to a thin mud rather than to a thick mud has the obvious advantage that contact is much more readily made within the mud between the treating agent and the contamination. The final advantage of this improved method of treatment is that since a preponderance of treating agent is maintained in the mud during the major portion of the time that the cement is being drilled through, there is a tendency for the individual pieces of drilled out cement to be coated exteriorly with an inert film of calcium carbonate, formed by the interaction of the lime in the cement with the bicarbonate ion provided by the treating agent. Thus the cement cutting as a whole becomes fairly resistant to further disintegrating action on its way to the top of the bore hole, and the amount of ground-up cement eventually dispersed in the mud fluid is materially reduced.

While within limits a considerable amount of cement contamination may be nullified by the addition of sodium bicarbonate, nevertheless as the total amount of cement present to be treated becomes greater the amount of soluble sodium salts remaining as a residue from the treatment also becomes greater in direct proportion. This sets a useful limit to the amount of cement contamination which can take place and be successfully treated. Thus it is important that all of the cement cuttings which can be bodily removed from the mud before they become dispersed therein be so taken out, and the advantage of this method of treatment in aiding this not only by providing a thinner mud which is capable of being handled by the vibrating screen but also in casing the pieces of cement in an impervious coating of calcium carbonate is evident. In a great many cases it has been possible using this method of treatment to reduce to 25% the amount of sodium bicarbonate calculated from previous experience necessary to be used.

While the cement used in setting casing is generally hydraulic cement of the Portland type, in rare instances oxy-chloride cements and even plaster of Paris cements have been used. Both of these latter cements yield di-valent ions to the mud fluid, generally calcium or magnesium ions, and these cements are susceptible to treatment with sodium bicarbonate in the same way that ordinary Portland cement is. Thus this invention must not be limited to apply merely to Portland cement, but is applicable to any hydraulic cement used in setting casing which has a flocculating action upon the mud fluid when drilled out. Moreover, this invention is of utility when passing through formations containing considerable calcium and magnesium compounds which have the property of unduly increasing the viscosity of the drilling fluid.

It will further be understood that sodium bicarbonate is not the only treating agent which may be used to overcome the effects of calcium and magnesium ion flocculation. Sodium carbonate, carbonic acid gas, sodium or ammonium oxalate, disodium phosphate, tetrasodium pyrophosphate, sodium hexametaphosphate, potassium ferrocyanide, and mixtures of these and similar compounds with tanstuffs such as quebracho and chestnut bark extract may also be used, and have chemical effects quite similar to sodium bicarbonate in that the calcium and magnesium ions are converted into an insoluble compound, thereby both removing them from solution and also encasing the particles of cement so that their further disintegration is inhibited.

It will further be understood that this invention is capable of variation, both as to environment and agents employed, within the scope of the appended claims. In the claims the expression "formation" includes the natural formations encountered in drilling as well as such as has been introduced, such as cement.

Having thus described the invention, what is claimed is:

1. In the art of drilling wells by the employment of a drilling fluid, with liability of contamination of the fluid during the course of drilling, the process comprising, determining the depth where such contamination occurs and starting treatment of the fluid, for a substantial period prior to continuation of drilling beyond such depth, with an agent which inhibits or neutralizes the effect of the contaminant.

2. In the art of drilling wells by the employment of a drilling fluid, with liability of contamination of the fluid during the course of drilling, the process comprising, determining the depth where such contamination occurs and starting treatment of the fluid, for a substantial period prior to continuation of drilling beyond such depth, with an agent which inhibits or neutralizes the effect of the contaminant and thereafter continuing such treatment.

3. In the art of drilling wells through formations by the employment of a drilling fluid, with liability of addition to the fluid of a di-valent ion when the drill penetrates a formation, the process comprising, determining the depth where such penetration occurs and starting treatment of the fluid, for a substantial period prior to the continuation of drilling beyond such depth, with an agent which inhibits or neutralizes the formation of such di-valent ion.

4. In the art of drilling wells by the employment of a drilling fluid, wherein such drilling is continued after cementing, the process comprising, determining the depth where the drill reaches the cement and starting treatment of the fluid, for a substantial period prior to continuation of drilling beyond such depth, with a cement-neutralizing agent.

5. In the art of drilling wells through formations by the employment of a drilling fluid, with liability of addition to the fluid from a formation of a viscosity-increasing agent, the process comprising, determining the depth where the drill reaches such formation and starting treatment of the fluid, for a substantial period prior to continuation of drilling beyond such depth, with a viscosity-reducing agent.

6. In the process of treating muds, contaminated at a certain depth in a bore-hole, by means of a chemical treating agent, comprising, determining the depth where such contamination occurs, and adding the treating agent to the mud a substantial period before drilling at such depth is continued.

7. In the process of treating muds, contaminated at a certain depth in a bore-hole, by means of a chemical treating agent, comprising, determining the depth where such contamination occurs, adding the treating agent to the mud a substantial period before drilling at such depth is continued, and continuing the addition of the treating agent to the circulating fluid until such depth is passed.

8. The treatment of cement-contaminated muds with bicarbonates, comprising, determining the depth where such contamination occurs, and adding bicarbonate to the mud stream a substantial period before drilling at such depth is continued.

9. The treatment of drilling fluids during the drilling-out of cement plugs, the process comprising, adding to the circulating fluid, a substantial period before the cement is drilled out, a substance having precipitating action upon the particles of cement.

LEON W. HUEBEL.